US012256750B2

United States Patent
Watt et al.

(10) Patent No.: US 12,256,750 B2
(45) Date of Patent: Mar. 25, 2025

(54) PRESERVING MIRACLE FRUIT BERRIES

(71) Applicant: Nature's Wild Berry, Santa Monica, CA (US)

(72) Inventors: Hansell Henry Watt, Santa Monica, CA (US); Juliano Bonanni, Santa Monica, CA (US)

(73) Assignee: Nature's Wild Berry, Santa Monica, CA (US)

( * ) Notice: Subject to any disclaimer, the term of this patent is extended or adjusted under 35 U.S.C. 154(b) by 0 days.

(21) Appl. No.: 18/196,770

(22) Filed: May 12, 2023

(65) Prior Publication Data

US 2024/0114914 A1 Apr. 11, 2024

Related U.S. Application Data

(63) Continuation of application No. 15/227,389, filed on Aug. 3, 2016, now abandoned.

(51) Int. Cl.
| | |
|---|---|
| *A23B 7/148* | (2006.01) |
| *A23B 7/024* | (2006.01) |
| *A23L 3/3427* | (2006.01) |
| *A23L 3/3436* | (2006.01) |
| *A23L 3/44* | (2006.01) |
| *A23L 19/00* | (2016.01) |
| *B65B 25/04* | (2006.01) |
| *B65B 63/08* | (2006.01) |
| *B65D 81/26* | (2006.01) |

(52) U.S. Cl.
CPC .............. *A23B 7/148* (2013.01); *A23B 7/024* (2013.01); *A23L 3/3427* (2013.01); *A23L 3/3436* (2013.01); *A23L 3/44* (2013.01); *A23L 19/03* (2016.08); *B65B 25/041* (2013.01); *B65B 63/08* (2013.01); *B65D 81/266* (2013.01)

(58) Field of Classification Search
CPC .......... A23L 3/44; A23L 3/3436; A23L 19/00; A23L 19/03; A23L 19/05; A23B 7/024; A23B 7/0215
See application file for complete search history.

(56) References Cited

U.S. PATENT DOCUMENTS

| | | | | |
|---|---|---|---|---|
| 2,091,372 A | * | 8/1937 | Moore | A23B 7/02 |
| | | | | 426/445 |
| 3,269,025 A | | 8/1966 | Dryden | |
| 3,395,022 A | * | 7/1968 | Vollink | A23B 7/024 |
| | | | | 426/385 |
| 3,676,149 A | * | 7/1972 | Fennell | A23B 7/024 |
| | | | | 530/370 |
| 3,824,323 A | * | 7/1974 | Fennell | A23L 27/31 |
| | | | | 426/429 |
| 3,898,323 A | * | 8/1975 | Fennell | A61K 33/10 |
| | | | | 424/44 |
| 3,920,815 A | * | 11/1975 | Harvey | A23L 27/31 |
| | | | | 514/21.92 |
| 4,948,609 A | * | 8/1990 | Nafisi-Movaghar | A23B 7/04 |
| | | | | 426/321 |
| 5,178,899 A | | 1/1993 | Kurihara | |
| 5,785,984 A | | 7/1998 | Kurihara | |
| 8,541,081 B1 | | 9/2013 | Ranganathan | |
| 2003/0170372 A1 | * | 9/2003 | May | A23B 7/022 |
| | | | | 426/640 |
| 2007/0160729 A1 | * | 7/2007 | Mori | A23L 27/10 |
| | | | | 426/520 |
| 2008/0311260 A1 | * | 12/2008 | Jager | B23K 26/38 |
| | | | | 426/385 |
| 2011/0091616 A1 | | 4/2011 | Jimenez Mendoza | |
| 2015/0144838 A1 | | 5/2015 | Iwamoto | |

FOREIGN PATENT DOCUMENTS

| | | | | | |
|---|---|---|---|---|---|
| CN | 102266111 B | * | 2/2013 | ............... | A23N 4/02 |
| CN | 104522564 A | * | 4/2015 | ........... | A23L 1/2121 |

OTHER PUBLICATIONS

CN102266111B USPTO Translation (Year: 2013).*
Freeze Drying NPL, published Mar. 26, 2006, https://web.archive.org/web/20060326040042/http://www.madenow.com/Volume-2/Freeze-Dried-Food.html (Year: 2006).
Garden Culture NPL, published Apr. 18, 2016, URL: https://gardenculturemagazine.com/beyond-the-garden/the-miracle-fruit/ (Year: 2016).

* cited by examiner

*Primary Examiner* — Erik Kashnikow
*Assistant Examiner* — Bryan Kim
(74) *Attorney, Agent, or Firm* — Foley & Lardner LLP

(57) ABSTRACT

Provided are methods of preserving and/or storing *Synsepalum dulcificum* berry, which may involve separating a pulp of the berry into two or more parts; and freeze drying the berry with the separated pulp.

14 Claims, No Drawings

PRESERVING MIRACLE FRUIT BERRIES

CROSS-REFERENCE TO RELATED PATENT APPLICATIONS

This application claims priority to and the benefit of U.S. patent application Ser. No. 15/227,389, filed Aug. 3, 2016, the content of which is incorporated herein by reference in its entirety.

FIELD

The present application relates to the field of preserving fruits and in particular, to preserving *Synsepalum dulcificum* berries.

SUMMARY

One embodiment is a method of preserving *Synsepalum dulcificum*, comprising obtaining a fresh *Synsepalum dulcificum* berry; separating a pulp of the berry into two or more parts; and freeze drying the berry with the separated pulp.

Another embodiment is a product comprising: a) an oxygen barrier packaging; b) an oxygen absorber, which is configured to reduce an oxygen content in an inner volume of said packaging; and c) a deseeded, freeze dried *Synsepalum dulcificum* berry placed in the inner volume of the said packaging, wherein the berry is sliced into two or more parts, said berry contains an effective amount of miraculin.

DETAILED DESCRIPTION

Unless otherwise specified, "a" or "an" means "one or more."

*Synsepalum dulcificum* (also known as miracle fruit, miracle berry, miraculous berry, sweet berry) is a plant known for its berry that, when eaten, causes sour and/or acidic foods (such as lemons and limes) subsequently consumed to taste sweet. This effect is due to miraculin.

Existing methods for *Synsepalum dulcificum* preserving may provide unsatisfactory results.

The present inventors developed a method of *Synsepalum dulcificum* preserving, which allows for a berry to remain potent a longer time. In some embodiments, the stored berry may remain potent, i.e. contain an effective amount of miraculin, after at least two weeks of storing, after at least three weeks of storing, after at least one month of storing, after at least 6 weeks of storing, after at least two months of storing, after at least three months of storing, after at least four months of storing, after at least five months of storing, after at least six months of storing, after at least six months of storing, after at least seven months of storing, after at least eight months of storing, after at least nine months of storing, after at least ten months of storing, after at least 11 months of storing, after at least 12 months of storing, after at least 15 months of storing, after at least 18 months of storing, after at least 21 months of storing, after at least 24 months of storing, after at least 30 months of storing, after at least 36 months of storing, after at least 48 months of storing, after 5 years of storing, after 6 years of storing, after 7 years of storing, after 8 years of storing, after 9 years of storing, after 10 years of storing, after 11 years of storing, after 12 years of storing, after 13 years of storing, after 14 years of storing, after 15 years of storing, after 16 years of storing, after 16 years of storing, after 17 years of storing, after 18 years of storing, after 19 years of storing, after 20 years of storing.

Upon storing the potency of the stored berry may be such that no more than two berries or no more than one berry may be sufficient to achieve a sour to sweet taste switch.

The effective amount of miraculin may mean that a stored *Synsepalum dulcificum* berry contains at least 10%, or at least 15%, or at least 20%, or at least 25%, or at least 30%, or at least 35%, or at least 40%, or at least 45%, or at least 50%, or at least 55%, or at least 60%, or at least 65%, or at least 70%, or at least 75%, or at least 80%, or at least 85%, or at least 90%, or at least 95% of a miraculin amount in a ripe berry when it was freshly picked.

The preserving method may involve obtaining a fresh *Synsepalum dulcificum* berry. The fresh berry may be a freshly picked berry or a berry stored in a freezer or a similar temperature environment within 30 minutes from being picked. A temperature of the freezer (or the similar environment) may be than −0° C., or less than −5° C., or less than −10° C., or less than −12° C., or less than −14° C., or less than −16° C., or less than −18° C. or any value or subrange within these ranges. In some embodiments, the fresh berry may be stored in the freezer (or the similar environment) no more or less than 60 days, or no more or less than 30 days, or no more or less than 25 days, or no more or less than 20 days, or no more or less than 15 days. For example, the fresh berry may be a berry stored at a temperature from 0° C. to −30° C., or from −2° C. to −28° C., or from −5° C. to −25° C., or from −10° C. to −25° C., or from −15° C. to 25° C. or any value or subrange within these ranges for no more or less than 30 days, or no more or less than 25 days, or no more or less than 20 days, or no more or less than 15 days.

A pulp of the fresh berry may be separated into two or more parts. For example, the pulp of the fresh berry may be sliced into two or more parts. Slicing may be performed using an appropriate slicing tool, such a knife or a blade. Preferably, each of the individual parts has a minimal dimension of no less or greater than 1 mm or no less or greater than 2 mm. Individual parts may be different or substantially the same in size. Substantially the same in size means that two parts do not differ in mass by more than 25%, or more than 20%, or more than 15%, or more than 10%, or more than 5%, or more than 3%, or more than 2% or more than 1%, or more than 0.5%. In some embodiments, the pulp may be separated only in two parts. In some embodiments, such two parts may be substantially equal in size. For example, a pulp of a fresh berry may be sliced into two parts or halves, which may be substantially equal in size.

Upon the separating, such as slicing, the berry may preserve its seed, which may mean that individual parts separated from each other may still remain attached to the seed of the berry.

A berry with a separated pulp may be freeze dried. The freeze drying process may involve rapidly freezing the berry to a temperature, which may be from −40° C. to −120° C., or from −45° C. to 100° C., or from −50° C. to −90° C. or any value or subrange within these ranges. The freeze drying may also involve applying a reduced pressure to the frozen berry. For example, the reduced pressure may be, for example, from 0.1 mbar to 100 mbar, or from 0.5 mbar to 50 mbar, or from 1 mbar to 20 mbar or any value or subrange within these ranges. In some embodiments, the reduced pressure may be from 0.3 mbar to 10 mbar, or from 0.66 mbar to 3.34 mbar. A number of commercial instruments exist for freeze drying.

In some embodiments, a berry may be freeze dried for at least 1 hour, or for at least 2 hours, or for at least 3 hours, or for at least 4 hours, or for at least 5 hours, or for at least 6 hours, or for at least 8 hours, or for at least 10 hours, or for at least 12 hours, or for at least 14 hours, or for at least 16 hours, or for at least 18 hours, or for at least 20 hours, or for at least 22 hours, or for at least 24 hours, or for at least 26 hours, or for at least 28 hours, or for at least 30 hours, or for at least 32 hours, or for at least 34 hours, or for at least 36 hours, or for at least 38 hours, or for at least 40 hours, or for at least 42 hours, or for at least 44 hours, or for at least 46 hours, or for at least 48 hours, or for at least 50 hours.

In some embodiments, a berry may be freeze dried from 1 hour to 50 hours, or from 2 hours to 45 hours, or from 3 hours to 40 hours, or from 4 hours to 35 hours or any subrange or value within these ranges.

The freeze drying may result in a loss of at least 80%, or at least 85%, or at least 90%, or at least 95%, or at least 96%, or at least 97%, or at least 98%, or at least 99% of water by the berry.

Preferably, upon the freeze drying, the separated parts of the pulp are such that each of the individual parts has a minimal dimension of no less or greater than 1 mm or no less or greater than 2 mm.

Preferably, the separated parts of the pulp do not form a powder upon the freeze drying.

Upon freeze-drying, the berry may be deseeded, which means the freeze dried parts of the pulp may be separated from the berry's seed. The seed then may be discarded.

The deseeded berry may be stored in an environment with a reduced oxygen content, which means a content of oxygen lower than an oxygen content under normal conditions, such as 20° C. and 1 atm). For example, the deseeded berry may be stored in an environment which has an oxygen content, which is no more than or less than 75%, or 70%, or 65%, or 60%, or 55%, or 50%, or 45%, or 40%, or 35%, or 30%, or 25%, or 20%, or 15%, or 10%, or 5%, or 3%, or 2%, or 1%, or 0.5% than the oxygen content under normal conditions.

Preferably, the deseeded berry is placed in a reduced oxygen content environment right after the deseeding. For example, the deseeded berry may be placed in the reduced oxygen environment no more than 30 minutes, or no more than 20 minutes, or no more than 15 minutes, or no more than 10 minutes, or no more than 5 minutes, or no more than 4 minutes, or no more than 3 minutes, or no more than 2 minutes, or no more than 1 minute, or no more than 45 seconds, or no more than 30 seconds, or no more than 25 seconds, or no more than 15 seconds, or no more than 10 seconds after the end of the freeze drying.

In some embodiments, the deseeded berry may be stored in an oxygen barrier packaging or container. Such packaging or container may be a sealed packaging or container. In some embodiments, the oxygen barrier packaging or container may be made of an oxygen barrier polymer. Oxygen barrier polymers are known in the art. Examples of oxygen barrier polymers include polyvinyl alcohol (PVOH), including biaxially oriented PVOH films; ethylene vinyl alcohol (EVOH) copolymers, including biaxially oriented EVOH films and EVOH/Nylon oriented coextrusions; polyvinylidene chloride copolymers (PVDC); nylon resins, including nylon 6, MXD6, isophthalic/terephthalic acid hexamethylenediamine nylon (6I/6T) amorphous nylon; polyacrylonitrile copolymers; polyethylene terephthalate polyester (PET), including biaxially oriented PET, which is known under trade names are Mylar™, Melinex™ and Hostaphan™; polyethylene naphthalate (PEN); poly(trimethylene terephthalate) (PTT or P3GT); resorcinol copolymers; liquid crystal polymers; aliphatic polyketones.

In some embodiments, an oxygen barrier polymer may be a coated polymer, i.e. a polymer covered with a coating. One example of a coating may be a silica coating.

A material for the oxygen barrier or container, such as an oxygen barrier polymer, may have $O_2$ permeability at 20-25° C. ranging from 0.001 to 10 (cc-mil)/100 $in^2$-day-atmosphere or from 0.002 to 7 (cc-mil)/100 $in^2$-day-atmosphere or from 0.01 to 6 (cc-mil)/100 $in^2$-day-atmosphere or from 0.05 to 5 (cc-mil)/100 $in^2$-day-atmosphere or from 0.1 to 5 (cc-mil)/100 $in^2$-day-atmosphere or any subrange or value within these ranges.

A volume of the packaging or container may vary. In some embodiments, a volume of the packaging or container may be from 5 to 1000 $cm^3$ or 10 to 500 $cm^3$ or 20 to 300 $cm^3$ or 30 to 200 $cm^3$ or any value or subrange within these ranges.

In some embodiments, the deseeded berry may be stored in a packaging or container together with an oxygen absorber or scavenger. Oxygen absorbers and scavengers are known in the art. In some embodiments, an oxygen absorber or scavenger may be a part of the packaging or container. Yet in some embodiments, an oxygen absorber or scavenger may be placed inside an inner volume of the packaging or container. An oxygen absorber or scavenger may contain a ferrous active material, such as ferrous carbonate and/or iron powder. In some embodiments, an oxygen absorber may be a non-ferrous oxygen absorber containing a non-ferrous active material, such as ascorbate or sodium hydrogen carbonate. In some embodiments, an oxygen absorber or scavenger may contain one or more of iron, activated carbon and silica, such as amorphous silica. In some embodiment, an oxygen absorber or scavenger may contain iron, activated carbon and silica, such as amorphous silica. An amount of an oxygen absorber or scavenger may be such so that it can effectively provide a desired oxygen content within an inner volume of the packaging or container.

In some embodiments, an individual berry may be placed into its own individual packaging or container. Yet in some embodiments, several, i.e. two or more, berries may be placed into an individual packaging or container.

Berries may be stored for up to 20 years in a cool and dry environment essentially without losing its potency, which may mean its ability to switch a sour taste into a sweet one. The term "cool" may mean temperatures of no more than 26° C. or no more than 25° C. or no more than 24° C. or no more than 23° C. or no more than 22° C. or no more than 21° C. or no more than 20° C. The term "dry" may mean a relative humidity at a particular temperature of no more or less than 60% or no more or less than 55% or no more or less than 50% or no more or less than 45% or no more or less than 40%.

The present preserving/storing methods provide one or more advantages over earlier methods. The present methods do not require either refrigeration or freezing for storing and/or shipping *Synsepalum dulcificum*. In particular, storing and/or shipping *Synsepalum dulcificum*, which was processed according to the above methods and stored in an oxygen barrier packaging with an oxygen absorber does not require using ice for cooling the berry down. As such, the present methods may make storing and/or shipping an individual *Synsepalum dulcificum* berry economically viable because no cost for ice is involved.

Embodiments described herein are further illustrated by, though in no way limited to, the following working examples.

WORKING EXAMPLES

Comparative Example 1

120 g of fresh *Synsepalum dulcificum* berries were purchased from Miracle Fruit Farm LLC, Miami, FL. The berries were packed with ice. The vendor provided instructions to put the berries in a freezer to maximize a shelf time of the active glycoprotein miraculin. After 3 weeks in the freezer, the berries turned black, while effectively losing all their use. The berries, which were tested by eating, did not produce a taste change from sour to sweet. As the result, the berries were discarded.

Comparative Example 2

120 g of fresh *Synsepalum dulcificum* berries were purchased from Miracle Fruit Farm LLC, Miami, FL. Freshly unpacked and potent berries, which came from the vendor refrigerated with ice packs in a small box, were sliced in half then dehydrated using Excalibur 9 dehydrator at 100 F in an effort to preserve the freshness. The dehydration was found to be ineffective for preserving the freshness of the berries. Although the berries did not change their color, it appears that they did not retain potent miraculin because no taste change from sour sour to sweet was observed upon eating the berries. The ineffectiveness of dehydration may be due to miraculin's sensitivity to heat. Also constant exposure of the berries to oxygen during the dehydration may have contributed to degrading of miraculin's potency.

Comparative Example 3

150 g of fresh *Synsepalum dulcificum* berries were purchased from Miracle Fruit Farm LLC, Miami, FL. Freshly unpacked and potent berries, which came from the vendor refrigerated with ice packs in a small box, were placed fully intact into a freeze drying machine (Harvest Right Freeze dryer, stainless steel, SKU: HRFD-SSTS). The temperature was −80° C., the pressure was 3.34 mbar, the berries were freeze dried for 28 hours. After the freeze drying, the whole berries were tasted. After eating 15 berries at a time, no effect of sour to sweet switch was noticed. Although the present invention is not limited by its theory of operation, it is believed that when a berry is freeze dried without some sort of puncture to the skin, the water cannot be fully extracted from the berry. Freeze drying means may provide benefits in fruit preservation through removing moisture as much as possible, preferably completely. When a *Synsepalum dulcificum* berry is free dried as a whole, some moisture is caught inside, which causes rapid deterioration of miraculin potency. It was also noted that the skin of the berry prevented the berry from rehydrating both sublingually and when submerged in a glass of water. Because this process failed the rehydration test and failed the potency test, it was concluded this method did not work.

Comparative Example 4

150 g of fresh *Synsepalum dulcificum* berries were purchased from Miracle Fruit Farm LLC, Miami, FL. Holes were poked through the pulp of freshly unpacked and potent berries, which came from the vendor refrigerated with ice packs in a small box. After that, the berries were placed into a freeze drying machine (Harvest Right Freeze dryer, stainless steel, SKU: HRFD-SSTS). The temperature was −80° C., the pressure was 3.34 mbar, the berries were freeze dried for 28 hours. After the freeze drying, the berries were tasted. It took more than four berries to achieve the effect of sour to sweet switch. Thus, it was concluded that this preserving method is not acceptable because the potency of the preserved berries was too weak to be considered effective.

Example 1

150 g of fresh *Synsepalum dulcificum* berries were purchased from Miracle Fruit Farm LLC, Miami, FL. Freshly unpacked and potent berries, which came from the vendor refrigerated with ice packs in a small box, were sliced in halves and then placed into a freeze drying machine (Harvest Right Freeze dryer, stainless steel, SKU: HRFD-SSTS). The temperature was −80° C., the pressure was 3.34 mbar, the berries were freeze dried for 28 hours. After the freeze drying, the seed was removed and the berries were tasted. One berry processed by this method was sufficient to achieve the effect of sour to sweet switch. Similar results were achieved when a berry was sliced into a larger number of pieces, before the freeze drying.

Immediately after the freeze drying and deseeding, a number of berries were placed in a mylar bag (2 in×3 in usable bag space. Sealed edge is approximately ⅜" on all sides. The bag is made of metallized polyester and polyethylene bond film. Opaque appearance. BPA free and can be frozen) with an oxygen absorber (Uline's 100 cc oxygen absorber containing, iron, activated carbon and amorphous silica, 1½ inches×2¼ inches in size). The berries in the mylar bags were stored in a cool (75 F) and dry (60% humidity) environment. After 4 months of storing, berries were taken from the bags and tasted. The potency of the stored berries was excellent as only one berry was sufficient to achieve the effect of sour to sweet switch.

Berries processed according to Example 1 had a superior potency compared to berries processed according to Comparative Examples 1-4.

Although the foregoing refers to particular preferred embodiments, it will be understood that the present invention is not so limited. It will occur to those of ordinary skill in the art that various modifications may be made to the disclosed embodiments and that such modifications are intended to be within the scope of the present invention.

All of the publications, patent applications and patents cited in this specification are incorporated herein by reference in their entirety.

What is claimed is:

1. A method of preserving *Synsepalum dulcificum*, comprising:
   a) obtaining a fresh *Synsepalum dulcificum* berry;
   b) halving the berry such that the pulp is separated into two portions of substantially equal size, wherein the seed of the berry remains attached to at least one of said portions; and
   c) freeze-drying the berry portions, wherein the freeze-dried portions are not in the form of a powder.

2. The method of claim 1, further comprising
   d) deseeding by removing the seed after said portions have been freeze-dried; and
   e) storing the deseeded portions in an environment with a reduced oxygen content.

3. The method of claim 1, wherein the freeze-drying is performed at a temperature ranging from −50° C. to −90° C.

4. The method of claim 3, wherein the freeze-drying is performed at a pressure 0.3 mbar to 10 mbar.

5. The method of claim 4, wherein the freeze-drying is performed for a time ranging from 1 hour to 50 hours.

6. The method of claim 2, wherein said storing comprises storing the deseeded portions in an oxygen barrier packaging.

7. The method of claim 6, wherein the oxygen barrier packaging is a biaxially oriented polyethylene terephthalate packaging.

8. The method of claim 2, wherein said storing comprises storing the deseeded portions with an oxygen absorber.

9. The method of claim 2, wherein said storing lasts at least one month and the stored portions preserve at least 50% of the miraculin of the fresh *Synsepalum dulcificum* berry.

10. The method of claim 9, wherein said storing lasts at least six months and the stored portions preserve at least 50% of the miraculin of the fresh *Synsepalum dulcificum* berry.

11. The method of claim 10, wherein said storing lasts at least twelve months and the stored portions preserve at least 50% of the miraculin of the fresh *Synsepalum dulcificum* berry miraculin.

12. The method of claim 2, wherein said storing does not involve refrigerating the deseeded.

13. The method of claim 2, wherein said storing does not involve applying ice packs to the deseeded.

14. The method of claim 2, wherein the stored deseeded portions contain at least 90% of the miraculin of the fresh *Synsepalum dulcificum* berry.

\* \* \* \* \*